United States Patent
Eriksson et al.

(10) Patent No.: US 10,764,750 B2
(45) Date of Patent: Sep. 1, 2020

(54) ENABLING ROAMING TO A VISITING COMMUNICATION NETWORK OF A WIRELESS TERMINAL BELONGING TO A HOME COMMUNICATION NETWORK

(71) Applicant: Telefonaktiebolaget LM Ericsson (publ), Stockholm (SE)

(72) Inventors: Hans Eriksson, Sollentuna (SE); Lars Westberg, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 130 days.

(21) Appl. No.: 16/077,508

(22) PCT Filed: Feb. 25, 2016

(86) PCT No.: PCT/EP2016/053923
§ 371 (c)(1),
(2) Date: Aug. 13, 2018

(87) PCT Pub. No.: WO2017/144096
PCT Pub. Date: Aug. 31, 2017

(65) Prior Publication Data
US 2019/0037398 A1 Jan. 31, 2019

(51) Int. Cl.
*H04L 29/06* (2006.01)
*H04W 12/06* (2009.01)
*H04W 8/12* (2009.01)
*H04W 36/00* (2009.01)
(Continued)

(52) U.S. Cl.
CPC ......... *H04W 12/06* (2013.01); *H04L 63/0272* (2013.01); *H04W 8/12* (2013.01);
(Continued)

(58) Field of Classification Search
CPC ..... H04W 12/06; H04W 12/00; H04W 36/00; H04W 76/10; H04W 8/12; H04W 12/0027; H04L 63/0272
See application file for complete search history.

(56) References Cited

U.S. PATENT DOCUMENTS 9,143,400 B1 * 9/2015 Roskind ............. H04L 41/0896
10,523,426 B2 * 12/2019 Jain ........................ H04L 9/0819
(Continued)

FOREIGN PATENT DOCUMENTS

EP 2557854 A2 2/2013

OTHER PUBLICATIONS

3RD Generation Partnership Project, "ATIS NFV Forum Background", 3GPP Draft, Jan. 13, 2016, pp. 1-34, 3GPP, France.
European Telecommunications Standards Institute, "Lawful Interception (LI); Cloud/Virtual Services (CLI)", Technical Report, Draft ETSI TR 101 567 V1.0.0, Jun. 1, 201, pp. 1-101, ETSI.

*Primary Examiner* — Mahfuzur Rahman
(74) *Attorney, Agent, or Firm* — Sage Patent Group

(57) ABSTRACT

A method is disclosed performed by a system (115) of a home communication network (110) for enabling roaming to a visiting communication network (120) of a first wireless communication terminal (130) belonging to the home communication network. The method comprises receiving, from the visiting network (120), an information of a connection attempt from the first terminal at the visiting network, detecting whether federated cloud roaming is allowed for the first terminal, and when federated cloud roaming is allowed for the first terminal, sending a request to the visiting network to deploy virtual network functions (128) reflecting a number of network functions (117) existing in the home network. The method further comprises communicating with the visiting network (120) in order to establish a virtual private network between the home network and the visiting network so that the virtual network functions (128) of the
(Continued)

visiting network are connected to the network functions (117) of the home network, receiving information from the visiting network that the virtual network functions are deployed for handling the first terminal (130), and in response to the received information, sending an acknowledgment to the visiting network (120) that the home network (110) acknowledges the connection attempt from the first terminal (130).

21 Claims, 12 Drawing Sheets

(51) Int. Cl.
      *H04W 12/00*       (2009.01)
      *H04W 76/10*       (2018.01)

(52) U.S. Cl.
      CPC .......... *H04W 12/00* (2013.01); *H04W 36/00* (2013.01); *H04W 76/10* (2018.02)

(56) References Cited

U.S. PATENT DOCUMENTS

| | | | | |
|---|---|---|---|---|
| 2009/0129371 | A1* | 5/2009 | Bishay | H04M 7/123 370/352 |
| 2014/0337940 | A1* | 11/2014 | Slavov | H04W 4/70 726/5 |
| 2014/0373012 | A1* | 12/2014 | Ylitalo | G06F 9/45558 718/1 |
| 2016/0241515 | A1* | 8/2016 | Pai | H04W 48/08 |

\* cited by examiner

ENABLING ROAMING TO A VISITING COMMUNICATION NETWORK OF A WIRELESS TERMINAL BELONGING TO A HOME COMMUNICATION NETWORK

TECHNICAL FIELD

The present disclosure relates generally to a methods, a system of a home network and a system of a visiting network for enabling roaming to a visiting communication network of a wireless communication terminal belonging to the home communication network. The present disclosure further relates to computer programs configured for enabling such roaming and carriers containing such computer programs.

BACKGROUND

In communication networks, and especially wireless communication networks, there is a need for wireless communication devices such as mobile phones to be able to communicate wirelessly even when outside its home communication network, i.e. the communication network belonging to an operator to which a user of the wireless communication device has a subscription.

For this reason there are roaming agreements between different wireless communication networks to allow a wireless communication device belonging to a home network to roam into a visiting network to which the wireless communication device does not have a subscription.

Also, in the 5$^{th}$ generation mobile communication systems and in vertical business segment use-cases as described in Next Generation Mobile Network, NGMN, www.NGM-N.org 5G white paper, a solution is required that works in a multi-operator environment.

A traditional solution to achieve that a device can roam into a visiting network is to use roaming as specified in 3GPP TS 23.401, or shared networks solutions as specified in 3GPP TS 23.251, or a Gateway Core Network, GWCN, solution or a Multi-Operator Core Network, MOCN, solution. However, those solutions require a number of dedicated business agreements between the networks that initially takes a long time to establish, and, as a consequence has a long time to adopt to changes.

The complexity in business agreements is about "Who pays for extra capacity investments, possibly including management and operations of the same in the other operator's network?" and "Who pays for the common assets of investments into a GPRS roaming exchange, GRX, network?" The GRX network acts as a hub for GPRS connections for roaming users, removing the need for a dedicated link between the wireless networks. Also there need to be an agreement on how fairness is solved regarding how to control resource usage between the operators of different networks. The cost could be divided into two parts, hardware, HW, capacity investments and in software, SW, licenses. In traditional node products, the cost for the operators is a combined cost with licenses on the node based on # user and capacity needs, so when accepting traffic from other operators into your own network this will also drive an increased cost and that the operator has to make earlier investments to upgrade capacity than was originally planned. So a way to minimize cost impacts for the operators to be able to provide roaming to wireless devices would be of high value.

SUMMARY

It is an object of the invention to address at least some of the problems and issues outlined above. It is an object of at least some embodiments to provide cost-efficient solutions for operators of wireless communication networks to provide roaming to communication devices. It is possible to achieve at least one of these objects and possibly others by using methods and systems as defined in the attached independent claims.

According to one aspect, a method is provided performed by a system of a home communication network for enabling roaming to a visiting communication network of a first wireless communication terminal belonging to the home communication network. The method comprises receiving, from the visiting network, an information of a connection attempt from the first terminal at the visiting network, detecting whether federated cloud roaming is allowed for the first terminal, and when federated cloud roaming is allowed for the first terminal, sending a request to the visiting network to deploy virtual network functions reflecting a number of network functions existing in the home network. The method further comprises communicating with the visiting network in order to establish a virtual private network between the home network and the visiting network so that the virtual network functions of the visiting network are connected to the network functions of the home network, receiving information from the visiting network that the virtual network functions are deployed for handling the first terminal, and in response to the received information, sending an acknowledgment to the visiting network that the home network acknowledges the connection attempt from the first terminal.

According to another embodiment, a method is provided performed by a system of a visiting communication network for enabling roaming to the visiting communication network of a first wireless communication terminal belonging to a home communication network. The method comprises sending, to the home network, an information of a connection attempt from the first terminal at the visiting network, receiving a request from the home network to deploy virtual network functions reflecting a number of network functions existing in the home network. The method further comprises, in response to the received deployment request, deploying the virtual network functions in the visiting network and communicating with the home communication network in order to establish a virtual private network between the home network and the visiting network so that the virtual network functions of the visiting network are connected to the network functions of the home network, sending information to the home network that the virtual network functions are deployed for handling the first terminal, and, in response to the sent information, receiving an acknowledgment from the home network that the home network acknowledges the connection attempt from the first terminal.

According to another aspect, a system is provided operable in a home communication network for enabling roaming to a visiting communication network of a first wireless communication terminal belonging to the home communication network. The system comprises a processor and a memory. The memory contains instructions executable by said processor, whereby the system is operative for receiving, from the visiting network, an information of a connection attempt from the first terminal at the visiting network, detecting whether federated cloud roaming is allowed for the first terminal, and when federated cloud roaming is allowed for the first terminal, sending a request to the visiting network to deploy virtual network functions reflecting a number of network functions existing in the home network. The system is further operative for communicating with the visiting network in order to establish a virtual private network between the home network and the visiting network so that the virtual network functions of the visiting network are connected to the network functions of the home network, receiving information from the visiting network that the virtual network functions are deployed for handling the first terminal, and in response to the received information, sending an acknowledgment to the visiting network that the home network acknowledges the connection attempt from the first terminal.

According to another aspect, a system is provided operable in a visiting communication network for enabling roaming to the visiting communication network of a first wireless communication terminal belonging to a home communication network. The system comprises a processor and a memory. The memory contains instructions executable by said processor, whereby the system is operative for sending, to the home network, an information of a connection attempt from the first terminal at the visiting network, receiving a request from the home network to deploy virtual network functions reflecting a number of network functions existing in the home network, and in response to the received deployment request, deploying the virtual network functions in the visiting network and communicating with the home communication network in order to establish a virtual private network between the home network and the visiting network so that the virtual network functions of the visiting network are connected to the network functions of the home network. The system is further operative for sending information to the home network that the virtual network functions are deployed for handling the first terminal, and in response to the sent information, receiving an acknowledgment from the home network that the home network acknowledges the connection attempt from the first terminal.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to facilitate roaming of wireless communication devices into visiting communication networks. This is solved based on a federated cloud-solution, i.e. that a home communication network belonging to a first operator pays for using data resources of a visiting communication network belonging to a second operator for being able to handle home network communication devices also when they are in a geographical area covered by the visiting network. For this reason, virtual network functions, VNF, are deployed in the visiting network using rented data resources in the visiting network, the VNFs being reflections of the network functions in the home network. A VNF is for example a virtual Public Data Network Gateway, also called Packet gateway, PGW, that is a reflection of a PGW in the home network. In other words, a solution is to use a federated cloud technology and deploy the home network's network functions in to the visited network's cloud infrastructure. By such solutions the home network uses its own VNF licenses for the network services the home network has already paid for. The cost of operation and management of the VNF is now part of the home operator, and not the visited operator. The extra cost from the visiting network is then radio resources in a specific area, cloud infrastructure, and potential Internet peering costs depending on peering agreements. Another gain is cost savings of the GRX network as user-plane data traffic can stay local in the visiting network.

Figure 1:
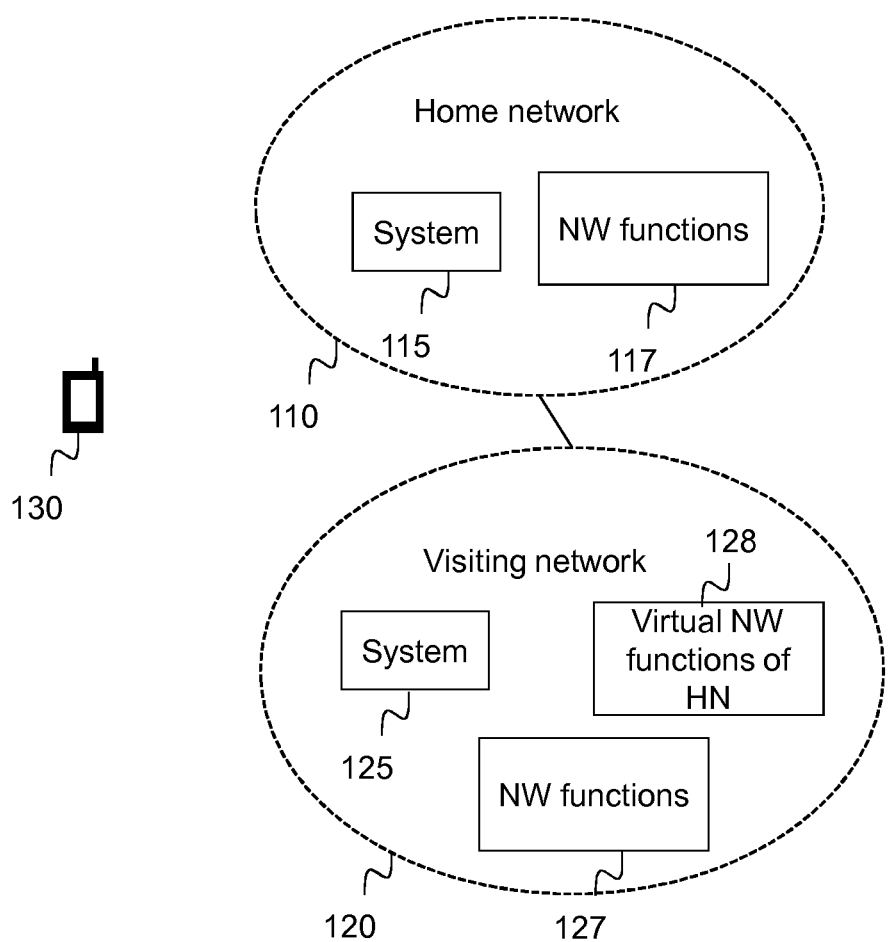
FIG. 1 is an overview of a communication system comprising a home communication network and a visiting communication network according to an embodiment.

FIG. 1 shows an overview of a communication system according to an embodiment, comprising a first communication network 110, which is a home network to a wireless communication terminal 130, i.e. the terminal 130 has a subscription to its home network 110. The wireless terminal may also be called a wireless device, or simply "terminal" or "device". The home network 110 comprises a system 115 that is arranged to perform one or more home network methods, which will be described in the following. The system 115 may comprise one or more nodes or functions of the home network. The home network 110 further comprises a number of network functions 117, such as PGW, Service Gateway, SGW, Mobility Management Entity, MME, etc. The communication system also comprises a second communication network 120, which is to be seen as a visiting network to the terminal 130, i.e. the terminal is a visitor when entering that network, as the terminal 130 does not have a subscription to the visiting network 120. The visiting network 120 comprises a system 125 that is arranged to perform one or more visiting network methods, which will be described in the following. The system 125 may comprise one or more nodes or functions of the home network. The visiting network 120 further comprises a number of network functions 127, such as PGW, Service Gateway, SGW, Mobility Management Entity, MME, etc. In addition, the visiting network 120 comprises a number of virtual network functions 128 reflecting a number of the network functions 117 of the home network 110.

Figure 2:
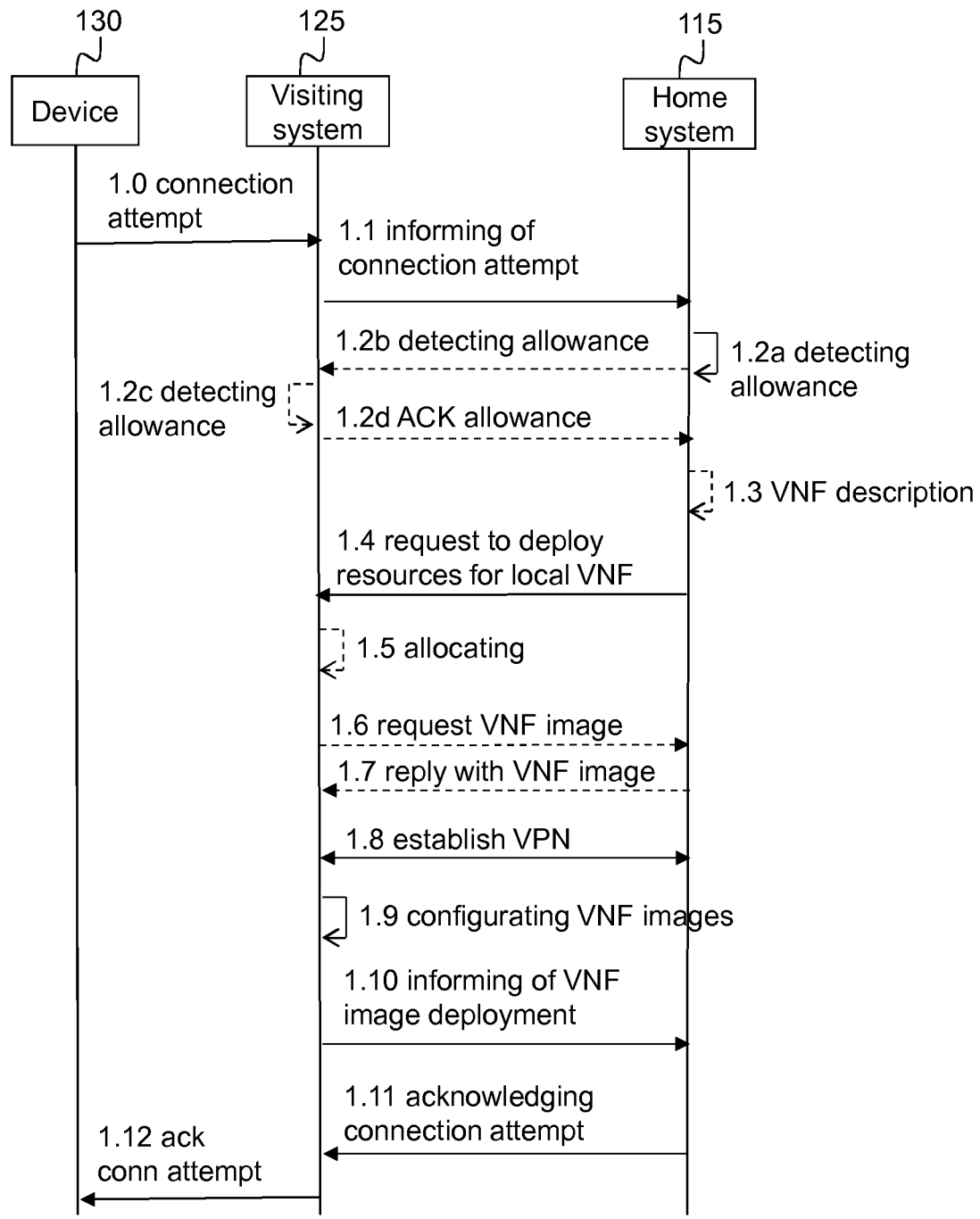
FIG. 2 is a signaling diagram illustrating an example of a procedure, according to possible embodiments.

FIG. 2 is a signaling diagram showing signals sent between the device 130, the system 125 of the visiting network 120, called visiting system, and the system 115 of the home network 110, called home system, according to an embodiment. After receiving 1.0 a connection attempt from the device 130 that belongs to the home network 110, the visiting system 125 informs 1.1 the home system 115 of the connection attempt. Thereafter, the home system detects 1.2a whether the device 130 is allowed to use federated cloud roaming and whether the home network has an agreement with the visiting network to use federated cloud roaming in the visiting network for devices of the home network. Further, a request 1.2b may be sent to the visiting system 125 so that the visiting system in its turn detects 1.2c whether it is allowed in the visiting network to use federated cloud roaming for devices coming from the home network 110. When allowed, the visiting system sends an allowance 1.2d back to the home system. When allowed, the home system obtains 1.3 a description of VNFs that are to be deployed at the visiting network, and sends 1.4 a request to the visiting system to deploy resources for setting up VNFs at the visiting network, according to the VNF description. In response to the request, the visiting system allocates 1.5 resources, i.e. SW resources, for the VNFs and sends 1.6 a request back to the home network for VNF images of the VNFs that are to be deployed. In response, the home network replies 1.7 by sending, to the visiting system, configuration data, possibly including an image license key, and the VNF images which are stored in the home network. The VNF images may be already pre-stored in the visited network's data storage resources. If VNF is already pre-stored in the visited network, the home system will only send a pointer to the VNF images and its configuration data, including the license key, enabling use of the VNF images(s) in the response back to the visited system. The visiting system and the home system then communicates in order to establish 1.8 a VPN between the home network and the visiting network. Further, the VNF images deployed are configured 1.9. Thereafter, the visiting system sends 1.10 to the home system information of the VNF deployment and configuration. The home system updates its network configuration to include the new VNFs as part of the home network. As a response, i.e. when the VNFs are deployed and ready to use, the home system acknowledges 1.11 the connection attempt of the device to the visiting system. In response to receiving the acknowledgement, the visiting system sends 1.12 an acknowledgement to the device acknowledging the connection attempt.

Figure 3:
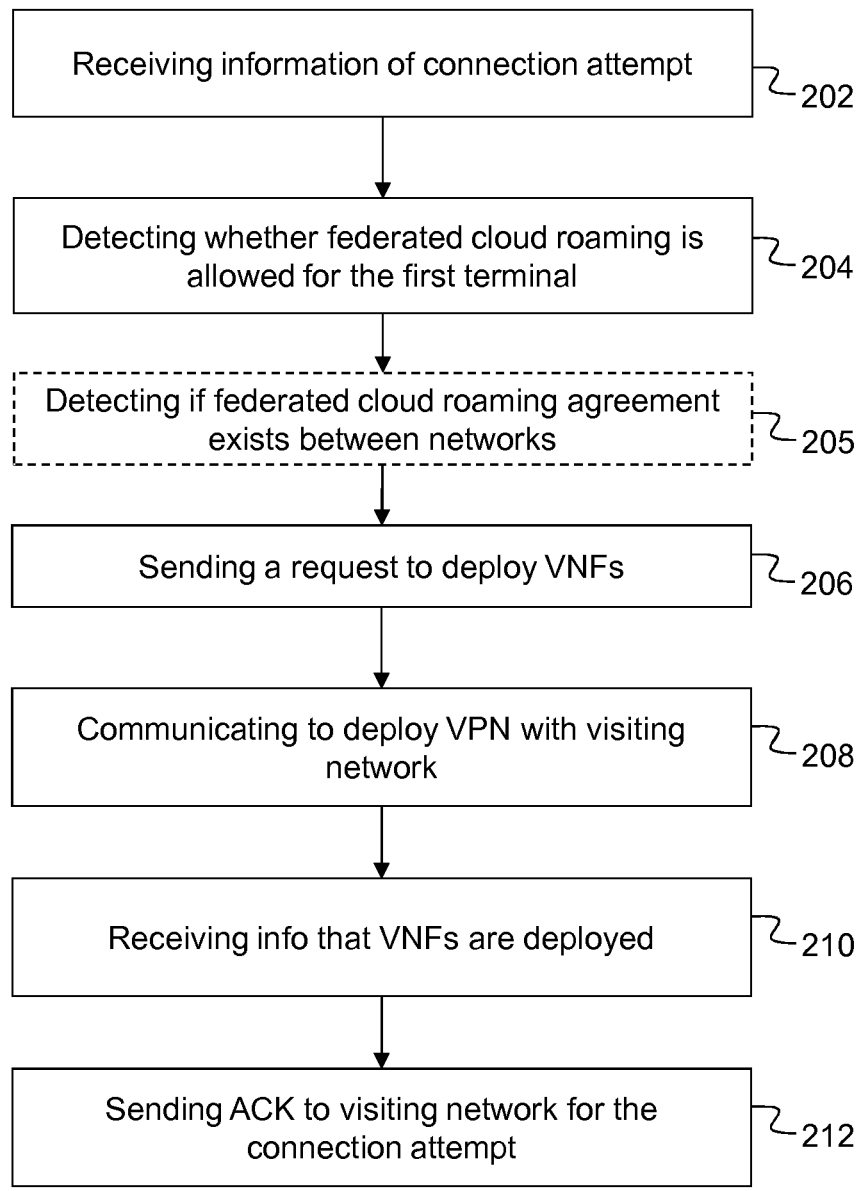
FIG. 3 is a flow chart illustrating a method performed by a system of a home communication network, according to possible embodiments.

FIG. 3, in conjunction with FIG. 1, describes an embodiment of a method performed by a system 115 of a home communication network 110 for enabling roaming to a visiting communication network 120, of a first wireless communication terminal 130 belonging to the home communication network. The method comprises receiving 202, from the visiting network 120, an information of a connection attempt from the first terminal at the visiting network and detecting 204 whether federated cloud roaming is allowed for the first terminal. The method further comprises, when federated cloud roaming is allowed for the first terminal, sending 206 a request to the visiting network to deploy virtual network functions 128 reflecting a number of network functions 117 existing in the home network, and communicating 208 with the visiting network 120 in order to establish a virtual private network between the home network and the visiting network so that the virtual network functions 128 of the visiting network are connected to the network functions 117 of the home network. The method further comprises receiving 210 information from the visiting network that the virtual network functions are deployed for handling the first terminal 130, and, in response to the received 210 information, sending 212 an acknowledgment to the visiting network 120 that the home network 110 acknowledges the connection attempt from the first terminal 130.

A federated cloud is defined as multiple cloud computing services, i.e. a plurality of servers that may be geographically separated. The multiple cloud computing services may be deployed and managed to match business need. A federation is a union of several smaller parts that perform a common action. Federated cloud roaming is for a first network, e.g. home network, to use cloud computing resources in a second network, e.g. visiting network, to handle wireless communication terminals that belong to the first network, i.e. terminals that have a subscription to the operator owning the first network.

The detecting 204 whether federated cloud roaming is allowed for the first terminal may be accomplished by e.g. using an ID of the first terminal to check up in a database of the home network whether the first terminal is allowed to use federated cloud roaming, e.g. if a subscription associated with the first terminal so allows. A Virtual Network Function, VNF, may typically be a virtualized 3GPP node as in MME, SGW, PGW, etc. A definition of VFN is made by ETSI NFV work, http://www.etsi.org/technologies-clusters/technologies/nfv. However, VFN it is not limited to traditional 3GPP nodes and can be network functions structured in a different way as in if the 3GPP nodes that are split into smaller parts, i.e. VNF Components, or a re-architected 3GPP functional node structure. But the industry today often associate it to virtualization of physical nodes, such as MME; PGW etc. The number of network functions in the home network reflected by virtual network functions in the visiting network may be e.g. home SGW, home PGW, home MME.

That the system of the home network communicates with the visiting network to establish a VPN may signify that any of the home network or the visiting network may initiate the establishing of the VPN. In an embodiment, the VPN is established before the virtual network functions are deployed. However, the VPN may not be established until the request to deploy local virtual network functions has been sent to the visiting network, and the request possibly also has been acknowledged by the visiting network. That the virtual network functions are deployed for handling the first terminal may comprise that the virtual network functions are instantiated in a specific position in the visiting network, configured into the visiting network, and possibly also started.

The system of the home communication network that performs the method may be one or more network functions of the home network, such as a federated cloud controller, a roaming policy server and/or a network configuration server. The one or more network functions may reside in one or more network nodes, e.g. servers. The system that performs the method may be a group of network nodes, wherein functionality for performing the method are spread out over different physical, or virtual, nodes of the network. The latter may be called a "cloud"-solution.

The above method enables a cost-efficient solution for handling roaming terminals. Further, the method is resource efficient since resources can be deployed when they are to be used. The method may further enable a way to meet requirements for 5G vertical use case as described by NGMN, resulting in improvement of time to market, TTM, and lower cost in how services are provided when using network resources in a visited network.

According to an embodiment, the sent 206 request to the visiting network 120 to deploy the virtual network functions 128 comprises an indicator indicating an image file pre-stored at the visiting network, the image file containing software for the virtual network functions. By having the image file pre-stored at the visiting network, the virtual network functions can be easily and quickly deployed. Further, communication resources can be spared since no large data amounts have to be transferred from the home network to the visiting network.

According to an embodiment, the sent 206 request to the visiting network 120 to deploy virtual network functions 128 comprises information on needed memory resources and processing capacity in the visiting network for the virtual network functions. Further, the method comprises receiving an acknowledgement from the visiting network that the memory resources and processing capacity have been allocated, and in response to the received acknowledgement, sending an image file containing software for the virtual network functions to the visiting network. Hereby, storage resources at the visiting network can be spared and only used when needed. For example, the storage resources at the visiting network can be shared between different networks which are to provide roaming abilities to their wireless devices. Further, a method is provided to provide VNFs that are not already stored at the visiting network.

According to another embodiment, the method further comprises detecting 205 whether a valid federated cloud roaming agreement exists between the home communication network and the visiting communication network, and when such a valid agreement exists, perform the sending 206 of the request to deploy virtual network functions. The detecting 205 may comprise the home network checking in e.g. a database whether it has a valid agreement for performing federated cloud roaming with the visiting network. The detecting may comprise checking with the visiting network whether the visiting network allows federated cloud roaming with the home network. The latter may be performed in an authentication procedure as described in the paragraph below. In an embodiment, both the home network and the visiting network has to allow federated cloud roaming for virtual network functions to be deployed in the visiting network. By such an embodiment, it is possible to check that there is an agreement of federated cloud roaming between the home network and the visiting network.

According to an embodiment, the detecting 205 of whether a federated cloud roaming agreement exists comprises sending an authentication request to the visiting network and in response to the sent authentication request receiving an authentication acknowledgement when the visiting network allowed federated cloud roaming for the home network.

Figure 4:
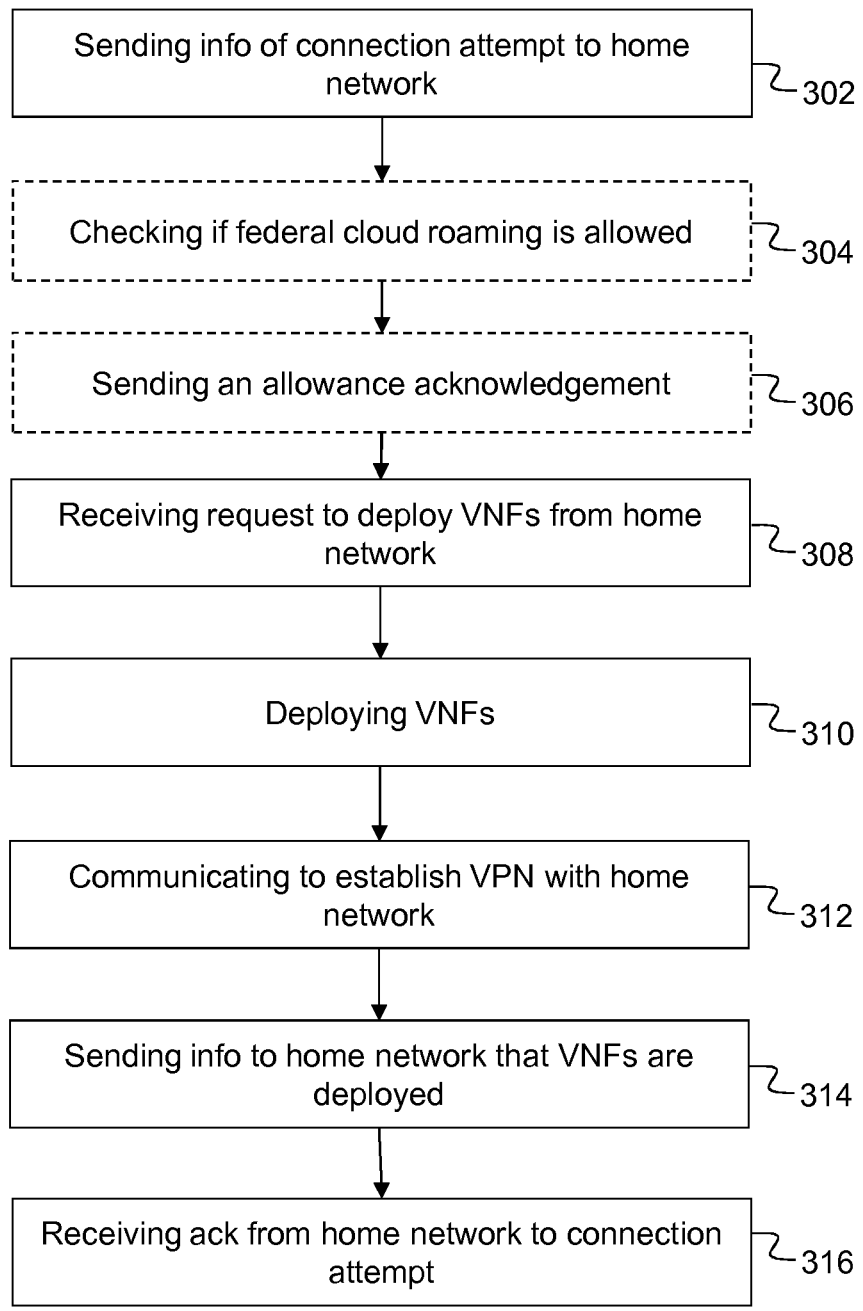
FIG. 4 is a flow chart illustrating a method performed by a system of a visiting communication network, according to possible embodiments.

FIG. 4, in conjunction with FIG. 1, describes an embodiment of a method performed by a system 125 of a visiting communication network 120 for enabling roaming to the visiting communication network of a first wireless communication terminal 130 belonging to a home communication network 110. The method comprises sending 302, to the home network, an information of a connection attempt from the first terminal 130 at the visiting network 120. The method further comprises, in response to the sent allowance acknowledgement, receiving 308 a request from the home network 110 to deploy virtual network functions 128 reflecting a number of network functions 117 existing in the home network, and, in response to the received deployment request, deploying 310 the virtual network functions 128 in the visiting network 120 and communicating 312 with the home communication network 110 in order to establish a virtual private network between the home network and the visiting network so that the virtual network functions 128 of the visiting network are connected to the network functions 117 of the home network. The method further comprises sending 314 information to the home network that the virtual network functions 128 are deployed for handling the first terminal 130, and, in response to the sent 314 information, receiving 316 an acknowledgment from the home network that the home network acknowledges the connection attempt from the first terminal.

The setting up 308 of the virtual network functions may include to configure the virtual network functions. The system of the visiting communication network that performs the method may be one or more network functions of the visiting network, such as a federated cloud controller, a roaming policy server and/or a network configuration server. The one or more network functions may reside in one or more network nodes, e.g. servers. The system that performs the method may be a group of network nodes, wherein functionality for performing the method are spread out over different physical, or virtual, nodes of the network. The latter may be called a "cloud"-solution.

According to an embodiment, the method further comprises, in response to receiving an allowance request from the home network 110, checking 304 whether federal cloud roaming is allowed for the home network, and if allowed, sending 306 an allowance acknowledgement to the home network. Further, the request from the home network 110 to deploy virtual network functions 128 is received 308 in response to the sent allowance acknowledgement.

According to an embodiment, the received 308 request from the home network 110 to deploy the virtual network functions 128 comprises an indicator indicating an image file pre-stored at the visiting network 120, the image file containing software for the virtual network functions. In the deployment of the virtual network functions, the system of the visiting network may deploy and configure the software of the image file.

According to an embodiment, the received 308 request from the home network 110 to deploy the virtual network functions 128 comprises information on needed memory resources and processing capacity in the visiting network 120 for the virtual network functions. The method may further comprise allocating the needed data resources, sending an acknowledgement to the home network that the needed data resources has been allocated, and in response to the sent acknowledgement, receiving an image file containing software for the virtual network functions 128, from the home network.

According to another embodiment, the deployment 310 of the virtual network functions 128 includes deployment and configuration of the virtual network functions, the configuration of the virtual network functions as well as needed network connectivity and capacity demands being performed or deployed according to configuration data received from the home network.

According to another embodiment, the configuration of the virtual network functions is further performed according to limitations of a roaming agreement between the visited network and the home network.

According to another embodiment, the virtual network functions 128 comprises a virtual Packet Gateway 402 reflecting a packet gateway (PGW) in the home network, and possibly also a virtual Service Gateway 404 reflecting a service gateway (SGW) in the home network and a virtual mobility management entity, MME (vMME), reflecting an MME in the home network, and possibly also a Radio Access Network as a Service, RANaaS 406, function, where the RANaaS 406 is configured to be connected to the virtual network functions. The reference signs in this embodiment refers to FIGS. 5-7, which figures will be described in the following paragraphs. The RANaaS is a pre-packet service that the operator of the home network buys from the visited network. I.e. it is still the visited network's radio license that is used. I.e. the operator of the home network buys RAN resources from the visiting network. In a future it may be so that also radio spectrum is a resource that is received by the operator of the home network where all the RAN is a virtualized function using technologies like software defined Radio. In other words, the virtualized network function RANaaS may also be a complete logical view of the radio access including radio licenses to be used where the operator of the home network configures needed radio parameters. The RANaaS is provided by the visited network and the service needs to be connected to the home network functions, included into IP address domain of home network. In addition, the RANaaS is configured with Home network identities such as for example PLMN-ID and potentially also radio license spectrum to be used. Further, the RANaaS is configured in the visiting network sharing the IP address range space that the RAN in the home network uses, as configured in the home networks DHCP server, i.e. using addresses within the same address range but not the same addresses as the RAN in the home network.

Figure 5:
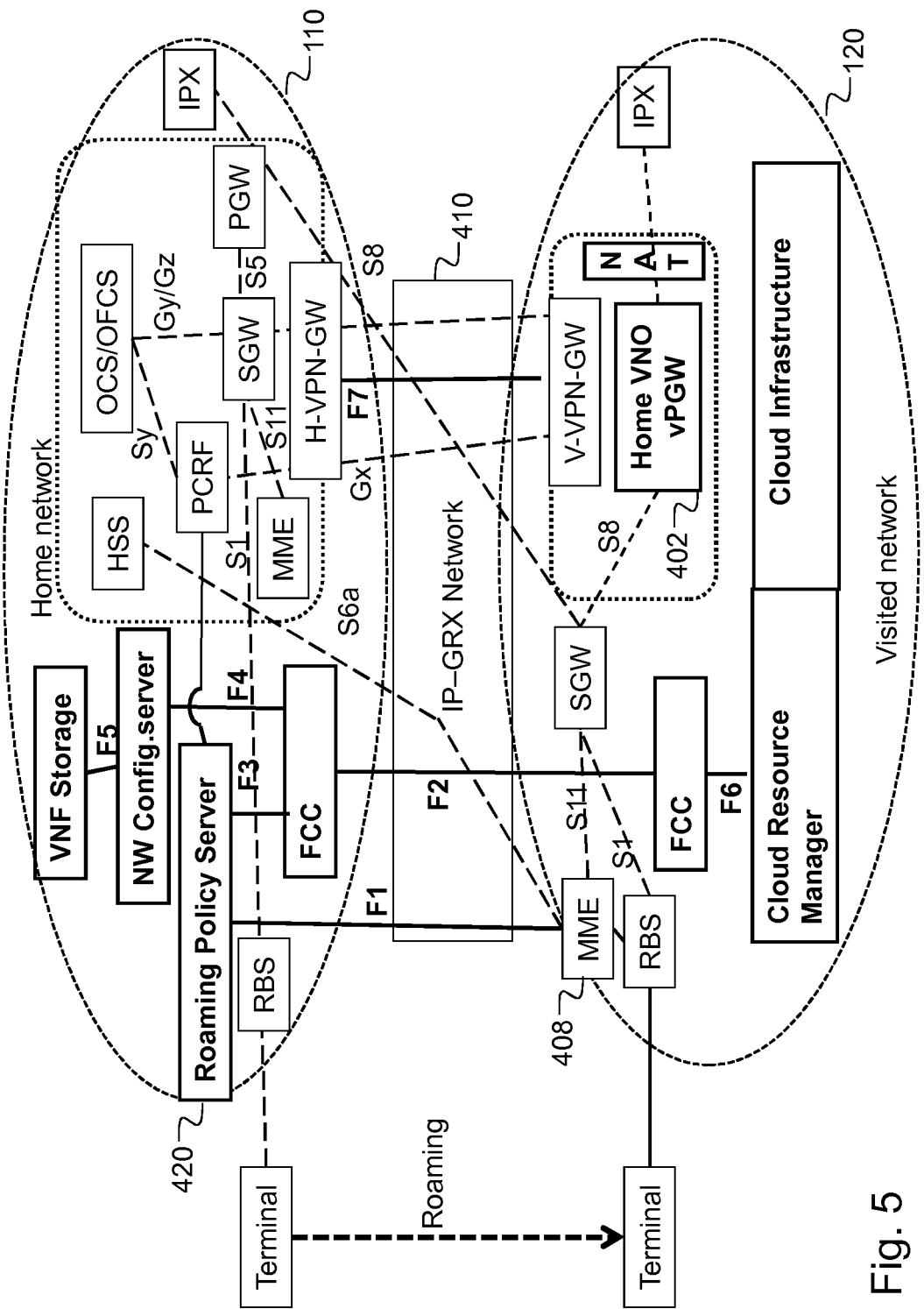
FIG. 5 is a block diagram of a communication system in which at least some embodiments of the present invention may be used.
Figure 6:
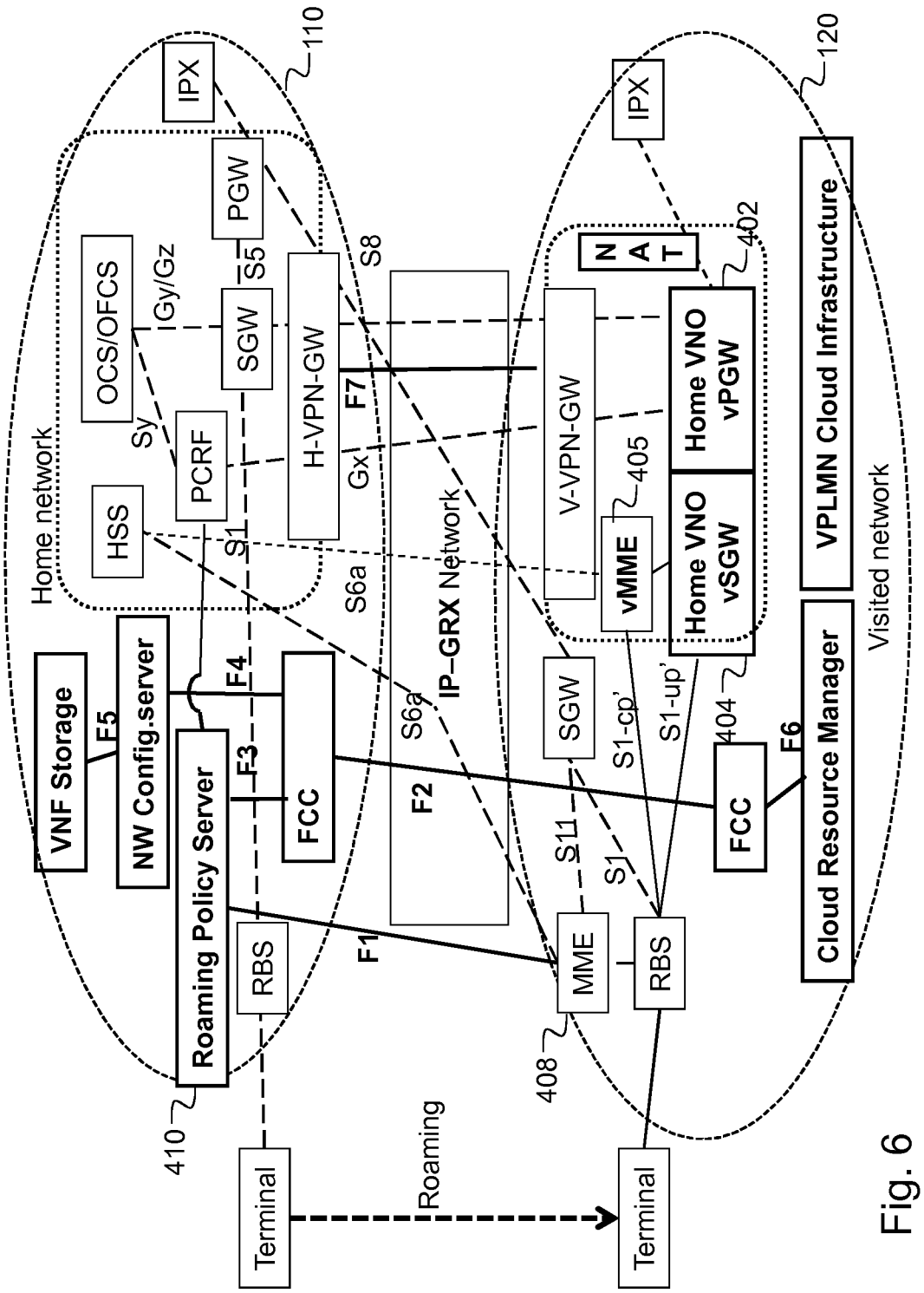
FIG. 6 is a block diagram of another communication system in which at least some embodiments of the present invention may be used.
Figure 7:
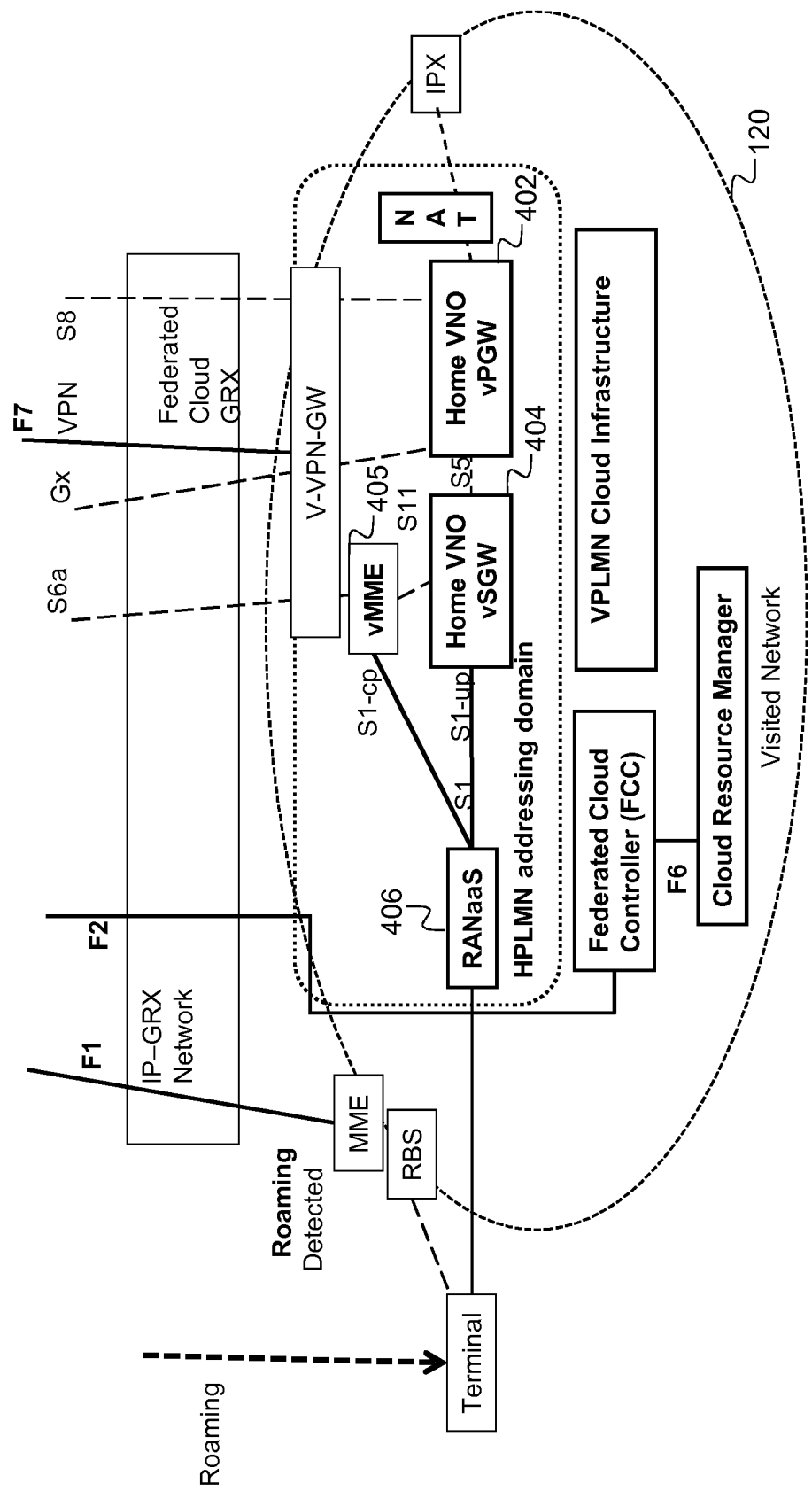
FIG. 7 is a block diagram of the visiting network of another communication system in which at least some embodiments of the present invention may be used.

In the following, the alternative embodiments for network architecture are described. In a first embodiment, which is shown in FIG. 5, the network function of the home network that is virtualized and deployed in the visiting network cloud infrastructure is a PGW, the virtualized PGW in the visiting network being denoted 402, and called Home network virtualized PGW, Home NW vPGW. In a second embodiment, shown in FIG. 6, the network functions of the home network that are virtualized and deployed in the visiting network cloud infrastructure are MME, SGW and PGE, the virtualized PGW being denoted 402, the virtualized SGW denoted 404 and the virtualized MME denoted 405. In a third embodiment, shown in FIG. 7, the network functions of the home network that are virtualized and deployed in the visiting network cloud infrastructure are MME, SGW and PGE, the virtualized PGW being denoted 402, the virtualized SGW denoted 404 and the virtualized MME denoted 405. Further, there is a RANaaS 406 function, where the RANaaS is deployed in the visiting network sharing an IP address space of a RAN in the home network. The different embodiment of FIGS. 5-7 are extensions to the well know 3GPP roaming architecture as described in 3GPP TS23 401. New functionality is illustrated with names in bold text. The new functionality common for the first, the second and the third embodiments are, in the home network 110, Virtual network function, VNF, storage, Network, NW, configuration server, Roaming policy server, and Federated cloud controller, FCC, and in the visiting network 120 Federated cloud controller, FCC, Cloud resource manager, cloud infrastructure, virtualized PGW 402 and a Network Address Translator, NAT. In addition, the second embodiment of FIG. 6 has (when deployed according to any of the methods described) the virtualized MME 405, and the virtualized SGW 404, and the third embodiment of FIG. 7, in addition to the second embodiment, has the RANaas 406. Further, new interface are labeled F1-F7.

The first alternative, FIG. 5, covers the case when the home network 110, HPLMN, deploys a vPGW 402 in the visited operator's network 120 using cloud orchestration mechanisms for VNF deployment in the cloud infrastructure, with the addition of new methods needed for federated cloud deployments over a GRX network 410. From the visited network's nodes, like RBS, SGW, the new deployed vPGW 402 looks the same as if it was deployed in the home operator network. I.e. it is no need to make additions to 3GPP standards. A novelty with the first alternative compared to prior art is the federated cloud deployment solution in combination with that the deployment of a vPGW 402 is done in the visited operator's network.

The second alternative, FIG. 6, is an extension to the first alternative were also vSGW 404 and vMME 405 is deployed together with the vPGW 402 in the visited operators network. The gain for the operator of the home network would be larger as the home operator can reuse more of its own network 110 resources/assets, i.e. MME, SGW and PGW software binaries and licenses, but it comes with a new problem to be solved: the interface towards the RBS in visited network 120. The IP address domain is different between the visited network's RBS and the vSGW 404 and vMME 405, i.e. the RBS cannot reach the vMME and vSGW and vice versa, and there is a need to extend interfaces S1-UP' between vMME and RBS and S1-CP' between vSGW and RBS in some way. A traditional way in pure IP node network problem is to put a NAT on that S1 interface and create configuration data in the visited operators Evolved Packet Core, EPC, network so a virtual SGW and MME is visible in the MME and SGW pools but with a knowledge that it belongs to another operator.

The third alternative, FIG. 7, is an extension to the first and the second alternative where the problem of RBS to vMME and vPGW is solved with a solution where Radio Access Network, RAN, is delivered as a service, RANaaS, to the operator of the home network 110. In FIG. 7 only the visiting network 120 is shown, the home network looks similar as in FIG. 5 and FIG. 6. In the third alternative, the RAN is deployed within the Home operator's infrastructure resources in visited network sharing the same IP address space. Details how RANaaS is developed as such is for example described in a Mobile Cloud EU-project, see http://www.mobile-cloud-networking.eu/site/. There are also other initiatives and studies how RANaaS can be developed. The RANaaS needs to be connected to the home operator's VNFs deployed in the visiting network.

The RANaaS exposes an Application Protocol Interface, API that enables the HPLMN to configure, manual or automatic, needed parameters in such a way that the RBS resource share that is used in the RANaaS shows that the radio share is part of the HPLMN, i.e. the PLMN-ID of the HPLMN is set in the VPLMNs RANaaS so that the wireless device will detect and select the HPLMN network in the infrastructure of the VPLMN.

Below the novel interfaces in the three alternatives of FIGS. 5-7 are described.

F1. The F1-interface defines communication between the MME 408 of the VPLMN 120 and the roaming policy server 420 of the HPLMN 110. In all three alternatives, the MME 408 of the VPLMN detects, according to normal 3GPP procedures with a Home Subscriber Server, HSS, of the home network that the device (hereinafter called the User Equipment, UE) is a roaming UE and has a HPLMN different from the VPLMN ID. If so, the MME 408 will contact the Roaming policy server 420 to check if this UE/Subscriber is allowed to use the federated cloud deployment feature/mechanisms.

F2. The F2-interface connects the FCCs, i.e. the cloud orchestration mechanisms together between the HPLMN and the VPLMN over the GRX network 410. The F2-interface allows on-boarding, control and management of VNFs from HPLMN deployed in the VPLMN's cloud infrastructure.

F3. The F3-interface is between the Roaming policy Server 420 and the FCC of the home network. The F3-interface carries information of which VNF(s) that are allowed to be deployed into the VPLMN's cloud infrastructure.

F4. The F4-interface is between the FCC of the home network and the NW configuration server in order for the FCC to request from the network configuration server a predefined network configuration of VNFs that are to be deployed in the VPLMN, together with the VNFs SW images.

F5. The F5-interface is between the NW configuration server and the VNF storage of the home network. The F5-interface is used by the NW configuration server to fetch the VNF SW images from the VNF storage.

F6. The F6-interface is between the FCC of the visiting network and the Cloud resource manager of the visiting network, responsible for the VNF orchestration in the visiting network, e.g. onboarding, start, control and management to termination of VNFs. SW images and network configurations are received from the HPLMN 110 through the FCCs of the home and the visiting networks.

F7. The F7-interface is a layer 2 or Layer 3 VPN interface over the GRX 410 that connects the HPLMN 110 with the newly deployed VNFs 402, 404, 405 in the VPLMN 120 clouds infrastructure so that they have common IP addressing domain. The VPN belongs to HPLMN and as such the VPN-GW in VPLMN is deployed as a virtualized GW as part of the SW image sent from the FCC of the HPLMN to the FCC of the VPLMN at deployment.

Figure 8:
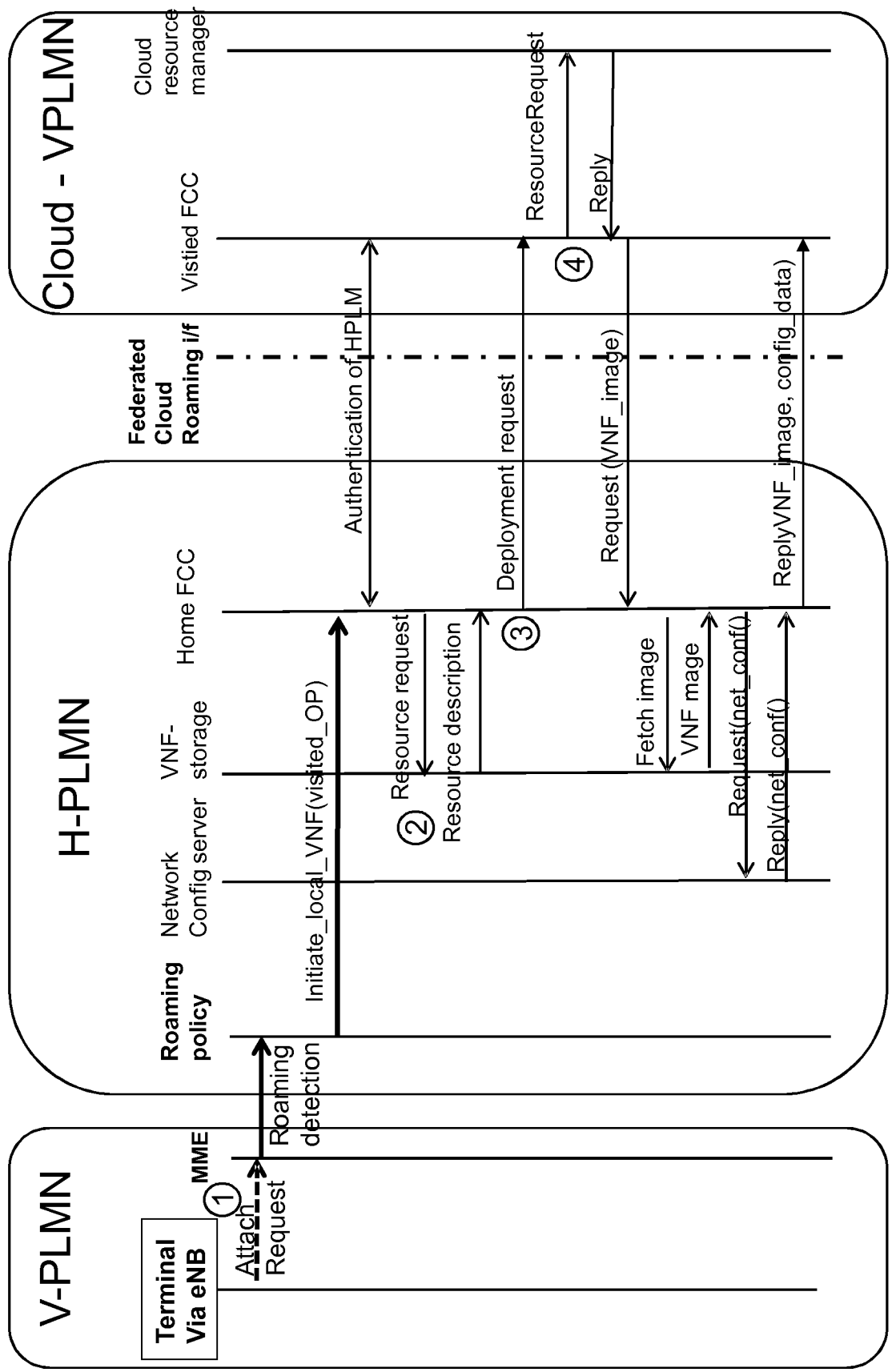
FIGS. 8-10 are signaling diagrams illustrating a procedure according to possible embodiments.
Figure 9:
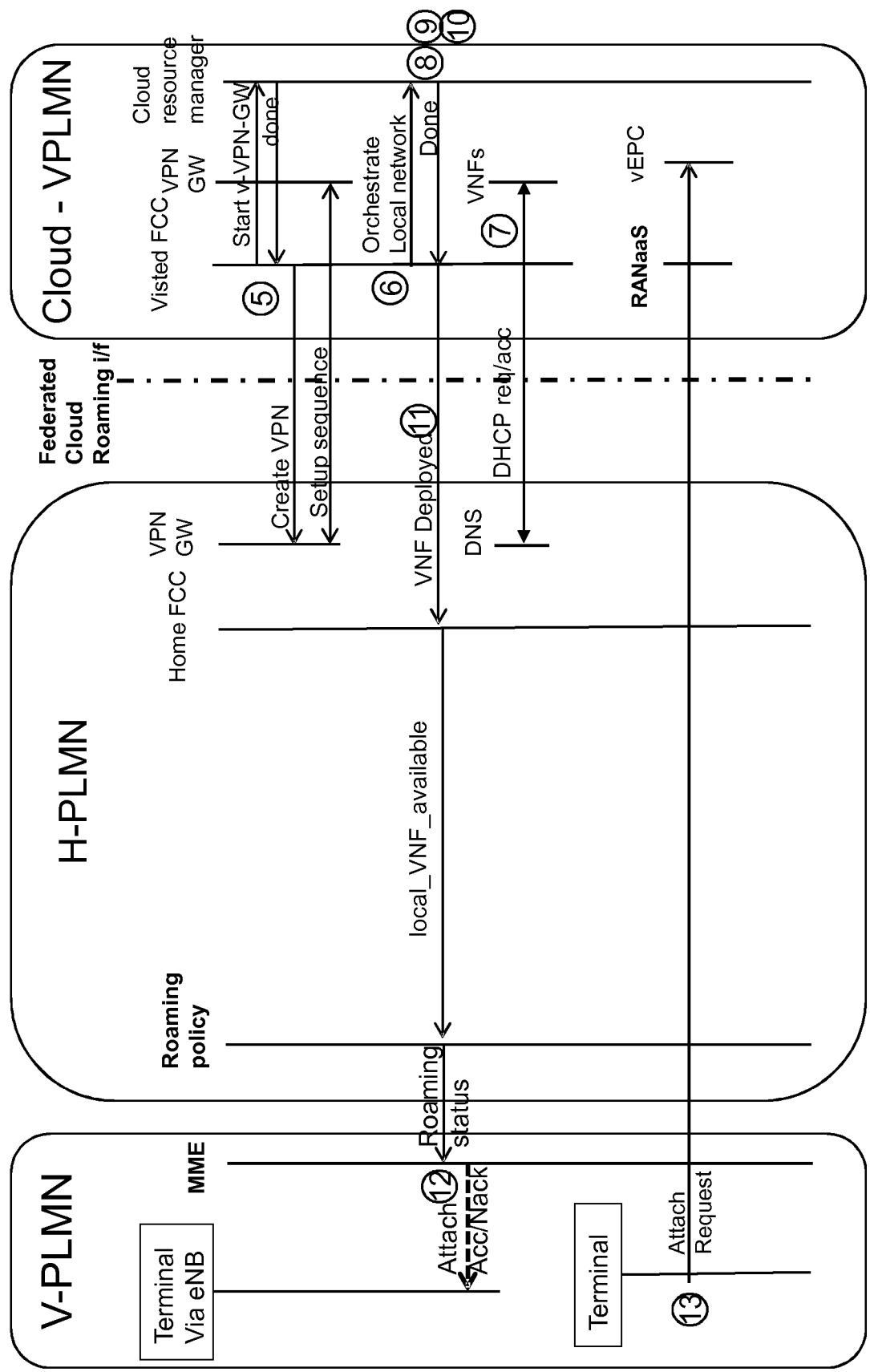
Figure 10:
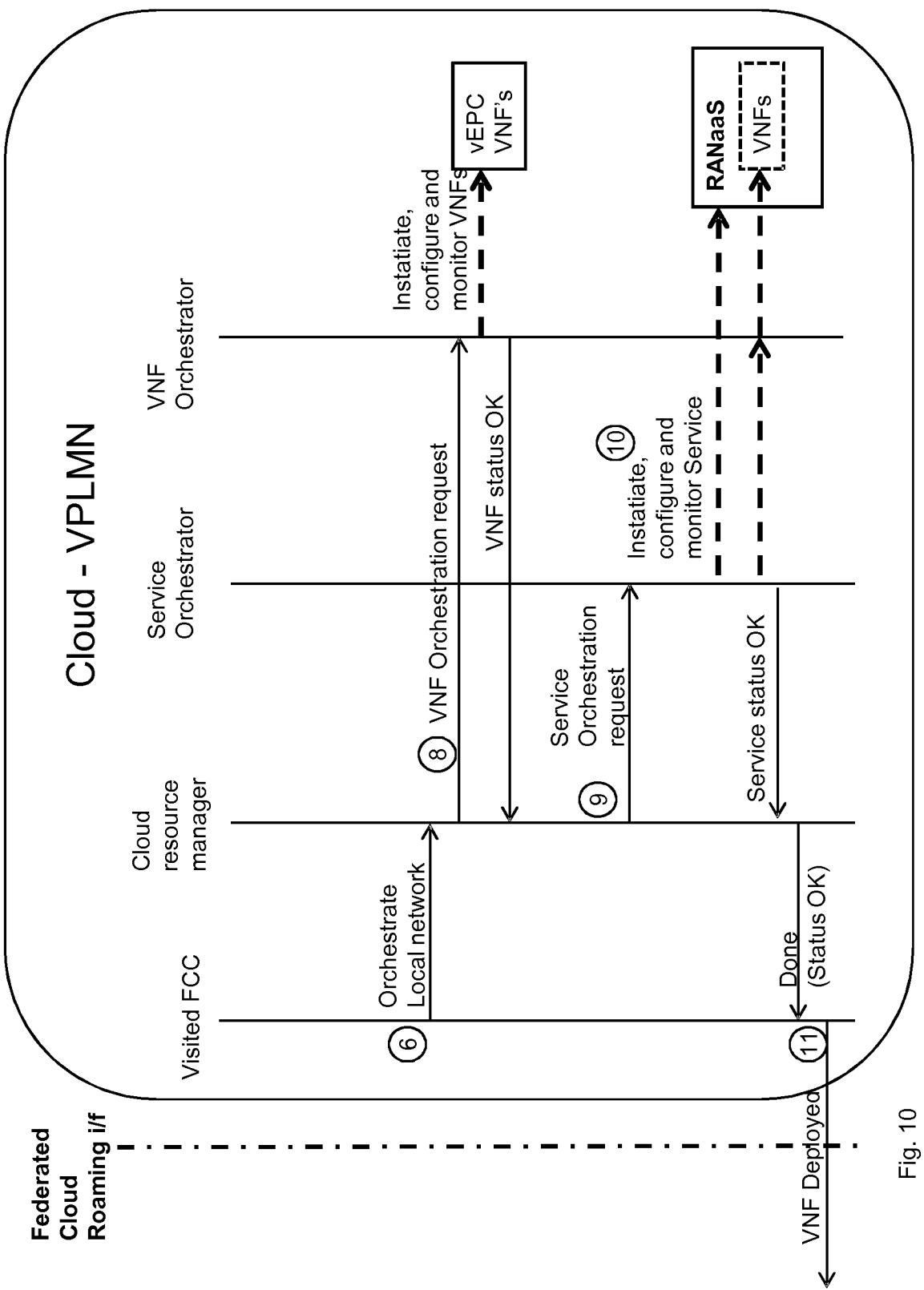

FIGS. 8-10 shows an embodiment of a procedure for VNF deployment in a network architecture as shown for example in any of FIGS. 5-7. The different steps mentioned below are denoted with encircled numbers in the figures.

Step 1. When a terminal, e.g. terminal 130, is roaming into the visited network, i.e. as in a normal 3GPP roaming procedure as described in 3GPP TS 23.401, the visited networks "control and policy logic", i.e. in this scenario it is the MME, checks if federated cloud roaming for the terminal is allowed by sending a "Roaming Detection" information to the home network's Roaming Policy Server. This is normally performed after a not shown normal roaming procedure has taken place where MME checks subscription of the terminal in the home HSS. If federated cloud roaming is allowed the Roaming policy server sends a message for initiating local VNFs in the visiting network, e.g. a Initiate_local_VNF (visited_OP), to the Home FCC, H-FCC, if there is not already a VPLMN Cloud infrastructure deployed in the visiting network with needed virtualized function. If HPLMN local network in federated cloud is already deployed with needed virtualized function, the sequence continues from step 13. If no federated cloud solution is deployed yet, the H-FCC sends an authorization request through Visited FCC in the VPLMN that runs an authentication procedure to check if HPLMN is authorized and have a federated cloud roaming agreement with VPLMN. The solution is not limited to this and other combinations is possible to e.g. to have Roaming policies stored in MME and/or that it is only Roaming policy server in visited that makes the authentication/Authorization if federated cloud deployments are allowed.

Step 2. On a positive reply from the Visited FCC, the Home FCC sends a configuration resource-request to VNF storage repository that returns with the resource descriptions for the virtualized network resources, e.g. vMME, vSGW, vPGW and v-VPN-GW, that is to be deployed, and possibly also amount of needed storage capacity in the visiting network, e.g. CPU, RAM.

Step 3. The home FCC then sends a VNF deployment request over the GRX network to visited FCC with information on needed resources, e.g. processing, memory networking, together with a reference to the VNFs' image storage. Storage can be in HPLMN as shown, but image files could have been already stored in a VPLMN storage service prior that a device make an attach request in VPLMN. In the latter case information is sent that leads the VPLMN to its image file storage.

Step 4. The visited FCC requests infrastructure Cloud resources from the cloud resource manager, the resource request comprising amount of needed storage capacity in the visiting network. When a positive reply is received informing that resources are allocated, possibly with an ID of a specified virtualized cloud infrastructure resource, the Visited FCC sends a request for the VNF-SW-image to the Home FCC that fetches the image from the VNF storage with its configuration data and returns VNF image and configuration data to the Visited FCC, for example a PGW image when a virtualized PGW is to be deployed. Network configuration data is requested from the Network configuration server, e.g. as a Request(net_conf). As part of the network configuration data replied to the Home FCC and sent further to the Visited FCC is also the H-PLMNs VPN Gateway, H-VPN-GW, tunneling end point IP address attached, which will be used by the VPLMN FCC to setup the network infrastructure. The V-VPN-GW node in visited cloud infrastructure will need its IP address allocated as part of the VNF configuration file, this to allow the below step to deploy a VPN over the GRX network to allow the other virtualized network nodes, e.g. vMME, vSGW and/or vPGW, to send a Dynamic Host Configuration Protocol, DHCP, request to the HPLMN. IP addresses of the VNFs (vMME, vSGW and vPGW) is created and attached to the configuration data by creating a new DNS-addresses in the infrastructure DNS of the home network together with information on the VNFs, e.g. MME, SGW and/or PGW, that will be deployed in visited federated cloud.

Step 5 (FIG. 9). The visited FCC, or alternatively the Home FCC (not shown), establishes a VPN over the GRX network so that the VNFs in the visited cloud infrastructure are connected back to the Home network domain as they were part of the site infrastructure domain in the home network. I.e. the Home network holds the infrastructure Domain Name Server, DNS, and DHCP server. In this way the HPLMNs virtualized nodes in the visited network are reachable and part of the HPLMN network for management and control. Reporting of Call Detail Records, CDR, and policy interfaces is the same as in traditional roaming and the MME in the visited network handles mobility signaling in same way as in traditional roaming. The VPN may be established by the visiting FCC sending a message to its cloud resource manager to start a virtualized visited VPN gateway, vV-VPN GW. The cloud resource manager reports back when it has started a vV-VPN GW. The visited FCC then sends a message to the VPN GW of the home network to ask for creation of the VPN, including source and destination address of a tunnel between the home and visiting VPN GW. Then a deployed sequence for setting up the VPN is accomplished between the home and visiting VPN GW.

Step 6. In step 6, the VNF images are deployed and started in the cloud resources in visited network, by sending a message from the visited FCC to the cloud resource manager to orchestrate local network. The IP addresses of the newly started images is configured, direct based on earlier received configuration data. Step 6 and steps 8-11 are seen more clearly in FIG. 10.

Step 7 shows an alternative option in IP address allocation of the VNFs, if IP address is not part of "configuration data" sent in step 4: When the virtualized network functions starts up they will send a DHCP request, as in normal IP networking, which is received by the home DHCP server that returns the IP-addresses to the virtualized nodes.

Step 8. In response to a VNF orchestration request sent from the cloud resource manager to a "VNF orchestrator", the Home PLMNs Local Network in the visiting network comprising the virtual EPC network containing the VNFs is started and configured by the VNF Orchestrator that creates and configures the VNFs and needed networking connectivity and capacity demands in transport network, Gi-LAN and IPX, i.e. Internet, service including Network Address Translator, NAT/Firewall, FW, that are required according to Service level agreement, SLA. E.g. policing/shaping is configured that vEPC stays within the SLA. The VNF orchestrator responds to the cloud resource manager when the VNFs are deployed and configured, with a VNF status OK. The detailed process how the VNFs are configured and orchestrated follows the ETSI NFV descriptions where each VNF has its Description file and where the VNFs is orchestrated by a VNF orchestrator.

Step 9. For the case when RANaaS is used as in the third alternative of FIG. 7, the RANaaS is deployed by a "Service orchestrator", in response to a request from the cloud resource manager, based on a HPLMNs Local network descriptor that holds the RANaaS description, and the results based on the Visited FCC control function that may add restrictions on how RANaaS is used, which is then sent to the Service orchestrator to instantiate and configure and deliver the RANaaS with its interfaces to be connected to vEPC. RANaaS SW image is deployed in the same infrastructure and IP address domain as of the home network, enabling the use of 3GPP specified mechanisms how to connect eNodeB to MME and SGW of the RANaaS. To include the Home PLMN-ID is configured into the RANaaS eNodeB representation. The implementation of RANaaS may be split into one part deployed in HPLMN address domain, while one part is still deployed internally in VPLMN address domain, but from the HPLMN it looks that the RANaaS is fully included in the HPLMN's address domain.

Step 10. Configuration of Network sharing interfaces on the RBS:s for MVNO operation, i.e. based on RAN-as-Service, is not described here as this is a different topic, and where some prior art exists, e.g. FP7 project publications in the "MobileClouId" project. During the creation/Instantiation of RANaaS it may also be composed of VNFs and in that case a "VNF Orchestrator" is connected to start and monitor those VNFs inside RANaaS.

Step 11. When the HPLMN's local network in the VPLMN's cloud infrastructure with all VNFs is started and configuration is done, i.e. the orchestration phase is completed in the federated cloud, an acknowledge message is sent from the visited FCC to the Home FCC that all local VNFs are available. The message is further from the home FCC to the roaming policy server of the home network.

Step 12. When the MME in VPLMN receives a "Roaming_status" message as an acknowledge to the "Roaming detected" message in step 1, the MME can decide to continue with a normal 3GPP attach procedure for the roaming terminal, or send a reject on the attach request message.

Step 13. When the terminal detects that its HPLMN radio is available, e.g. the HPLMNs RANaaS in case RANaaS is used, the terminal will make a network re-selection by sending an Attach Request to the HPLMN and if the terminal is still attached to VPLMN it will make an de-attach request to VPLMNs network, using mechanisms as in 3GPP specifications. The attach sequence to the HPLMN is now done towards the RANaaS and the vEPC, e.g. vMME, vSGW and vPGW locally deployed in the visited network's infrastructure. From the attach sequence, normal 3GPP signaling continues as specified in TS 23.401. There is also an alternative that the terminal is forced to do a Detach from the VPLMN before the terminal detects that HPLMN's RANaaS is available, or by a negative response to the earlier Attach request, to force the terminal to make a new network re-selection. A third alternative is that a handover is carried out if the HPLMN's local network is already deployed in the VPLMN federated cloud infrastructure, i.e. in this case the terminal will do a normal 3GPP handover following 3GPP specified signaling sequence.

Figure 11:
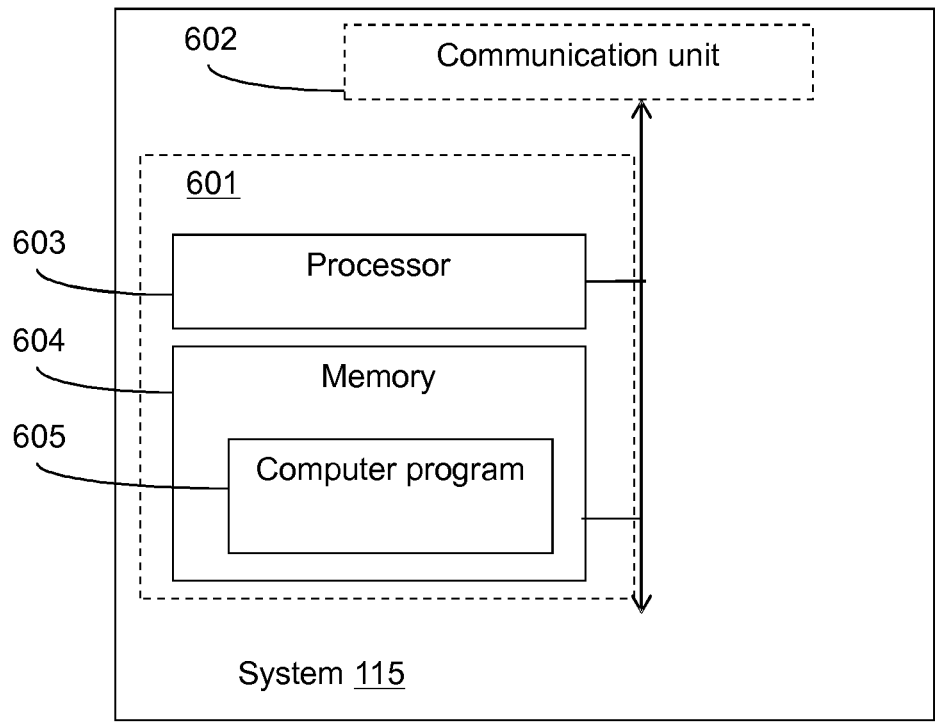
FIGS. 11-12 are schematic block diagrams illustrating systems of a home communication network according to possible embodiments.

FIG. 11, in conjunction with FIG. 1, describes an embodiment of a system 115 operable in a home communication network 110 for enabling roaming to a visiting communication network 120 of a first wireless communication terminal 130 belonging to the home communication network. The system 115 comprises a processor 603 and a memory 604. The memory 604 contains instructions executable by said processor, whereby the system 115 is operative for receiving, from the visiting network 120, an information of a connection attempt from the first terminal at the visiting network, detecting whether federated cloud roaming is allowed for the first terminal, and when federated cloud roaming is allowed for the first terminal, sending a request to the visiting network to deploy virtual network functions 128 reflecting a number of network functions 117 existing in the home network. The system 115 is further operative for communicating with the visiting network 120 in order to establish a virtual private network between the home network and the visiting network so that the virtual network functions 128 of the visiting network are connected to the network functions 117 of the home network, for receiving information from the visiting network that the virtual network functions are deployed for handling the first terminal 130, and in response to the received information, sending an acknowledgment to the visiting network 120 that the home network 110 acknowledges the connection attempt from the first terminal 130.

The system 115 of the home network may be one or more network functions of the home network, such as a federated cloud controller, a roaming policy server and/or a network configuration server. The one or more network functions may reside in one or more network nodes, e.g. servers. The system may be a group of network nodes, wherein functionality of the system is spread out over different physical, or virtual, nodes of the home network. The latter may be called a "cloud"-solution.

According to an embodiment, the request that the system is operative for sending to the visiting network 120 to deploy the virtual network functions 128 comprises an indicator indicating an image file pre-stored at the visiting network, the image file containing software for the virtual network functions.

According to another embodiment, the request that the system is operative for sending to the visiting network 120 to deploy the virtual network functions 128 comprises information on needed memory resources and processing capacity in the visiting network for the virtual network functions. Further, the system is operative for receiving an acknowledgement from the visiting network that the needed memory resources and processing capacity have been allocated, and, in response to the received acknowledgement, sending an image file containing software for the virtual network functions to the visiting network.

According to an embodiment, the system is further operative for detecting whether a valid federated cloud roaming agreement exists between the home communication network and the visiting communication network, and when such a valid agreement exists, performing the sending of the request to deploy virtual network functions.

According to an embodiment, that the system is operative for detecting whether a federated cloud roaming agreement exists, comprises the system being operative for sending an authentication request to the visiting network and in response to the sent authentication request receiving an authentication acknowledgement if the visiting network allowed federated cloud roaming for the home network.

According to other embodiments, the system 115 may further comprise a communication unit 602, which may be considered to comprise conventional means for communicating from and/or to other systems or nodes in the home network 110 or in the visiting network 120. The communication unit 602 may comprise one or more communication ports for communicating with the other nodes in the network. The instructions executable by said processor 603 may be arranged as a computer program 605 stored e.g. in the memory 604. The processor 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the actions and/or methods mentioned above.

Figure 12:
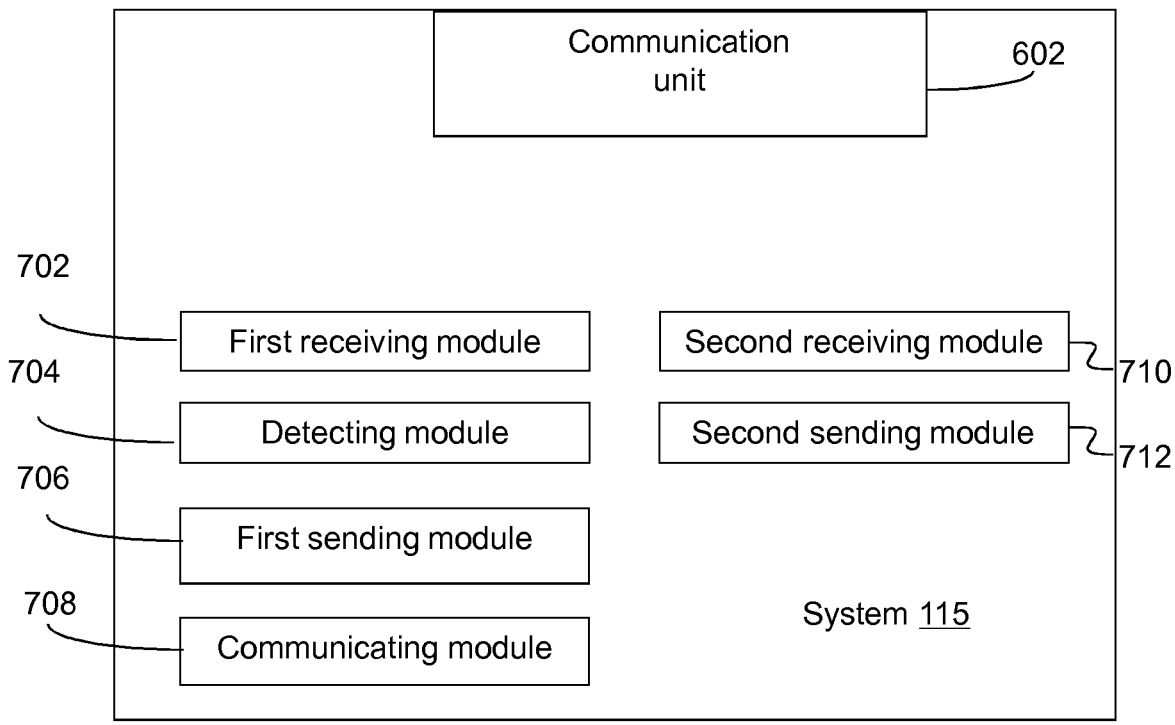

FIG. 12, in conjunction with FIG. 1, shows an embodiment of a system 115 operable in a home communication network 110 for enabling roaming to a visiting communication network 120 of a first wireless communication terminal 130 belonging to the home communication network. The system 115 comprises a first receiving module 702 for receiving, from the visiting network 120, an information of a connection attempt from the first terminal at the visiting network, a detecting module 704 for detecting whether federated cloud roaming is allowed for the first terminal, a first sending module 706 for sending a request to the visiting network to deploy virtual network functions 128 reflecting a number of network functions 117 existing in the home network, when federated cloud roaming is allowed for the first terminal. The system 115 further comprises a communicating module 708 for communicating with the visiting network 120 in order to establish a virtual private network between the home network and the visiting network so that the virtual network functions 128 of the visiting network are connected to the network functions 117 of the home network, a second receiving module 710 for receiving information from the visiting network that the virtual network functions are deployed for handling the first terminal 130, and a second sending module 712 for sending an acknowledgment to the visiting network 120 that the home network 110 acknowledges the connection attempt from the first terminal 130, in response to the received information. The system 115 may further comprise a communication unit 602 similar to the communication unit of FIG. 11.

Figure 13:
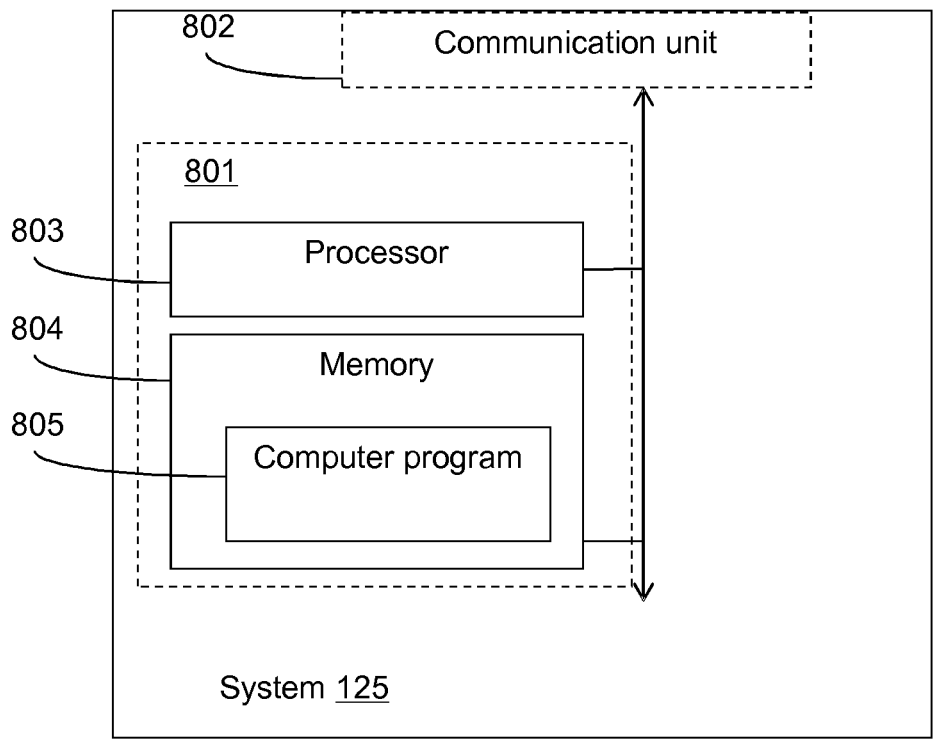
FIGS. 13-14 are schematic block diagrams illustrating systems of a visiting communication network according to possible embodiments.

FIG. 13, in conjunction with FIG. 1, shows a system 125 operable in a visiting communication network 120 for enabling roaming to the visiting communication network of a first wireless communication terminal 130 belonging to a home communication network 110. The system 125 comprises a processor 803 and a memory 804. The memory contains instructions executable by said processor, whereby the system 125 is operative for sending, to the home network, an information of a connection attempt from the first terminal 130 at the visiting network 120, receiving a request from the home network 110 to deploy virtual network functions 128 reflecting a number of network functions 117 existing in the home network, and, in response to the received deployment request, deploying the virtual network functions 128 in the visiting network 120 and communicating with the home communication network 110 in order to establish a virtual private network between the home network and the visiting network so that the virtual network functions 128 of the visiting network are connected to the network functions 117 of the home network. The system 125 is further operative for sending information to the home network that the virtual network functions 128 are deployed for handling the first terminal 130, and in response to the sent information, receiving an acknowledgment from the home network that the home network acknowledges the connection attempt from the first terminal.

According to an embodiment, the system is further operative for, in response to receiving an allowance request from the home network 110, checking whether federal cloud roaming is allowed for the home network and if allowed, sending an allowance acknowledgement to the home network, and, wherein the system is operative to receive the request from the home network 110 to deploy virtual network functions 128 in response to the sent allowance acknowledgement.

According to another embodiment, the request that the visiting system is operative to receive from the home network 110 to deploy the virtual network functions 128 comprises an indicator indicating an image file pre-stored at the visiting network 120, the image file containing software for the virtual network functions.

According to another embodiment, the request that the system is operative to receive from the home network 110 to deploy the virtual network functions 128 comprises information on needed memory resources and processing capacity in the visiting network 120 for the virtual network functions. The system may further be operative for allocating the needed data resources, sending an acknowledgement to the home network that the needed data resources has been allocated, and, in response to the sent acknowledgement, receiving an image file containing software for the virtual network functions 128, from the home network.

According to another embodiment, the system being operative for deployment of the virtual network functions 128 includes the system being operative for deployment and configuration of the virtual network functions, the configuration of the virtual network functions as well as needed network connectivity and capacity demands being performed or deployed according to configuration data received from the home network.

According to another embodiment, the virtual network functions 128 comprises a virtual PGW 402 reflecting a PGW in the home network, and possibly also a virtual SGW 404 reflecting an SGW in the home network and a virtual MME 405, reflecting an MME in the home network, and possibly also a Radio Access Network as a Service, RANaaS 406, function, where the RANaaS is configured to be connected to the virtual network functions.

According to other embodiments, the system 125 may further comprise a communication unit 802, which may be considered to comprise conventional means for communicating from and/or to other systems or nodes in the visiting network 120 or in the home network 110. The communication unit 802 may comprise one or more communication ports for communicating with the other nodes in the networks. The instructions executable by said processor 803 may be arranged as a computer program 805 stored e.g. in the memory 804. The processor 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the actions and/or methods mentioned above.

Figure 14:
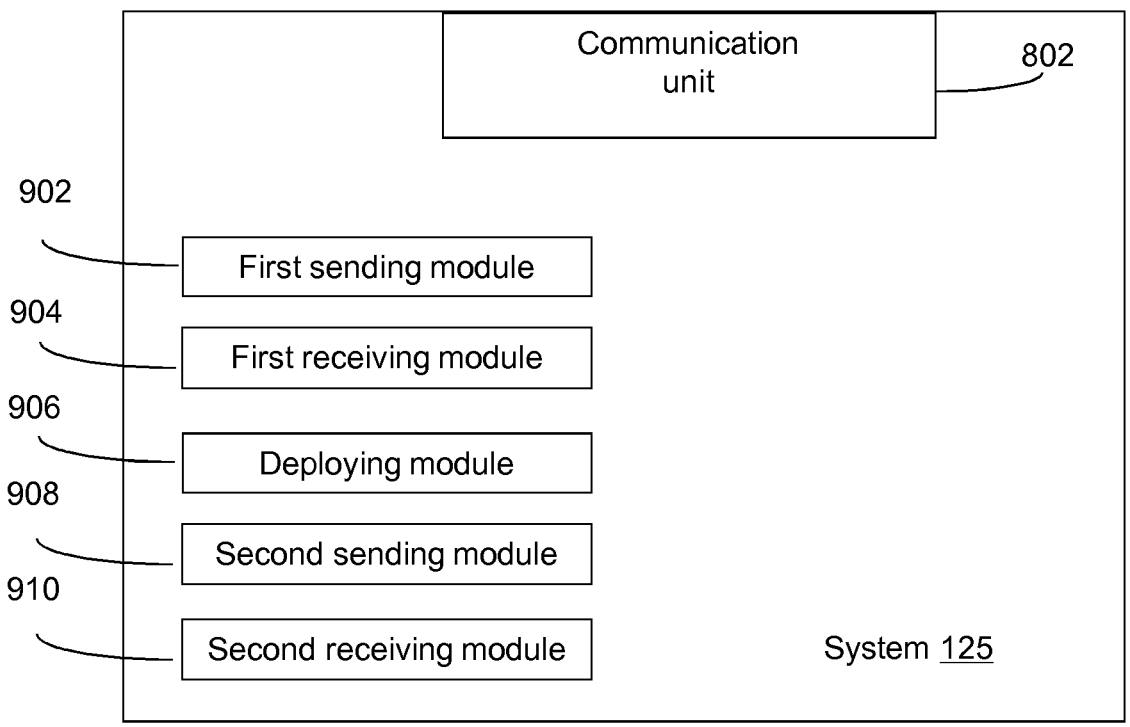

FIG. 14, in conjunction with FIG. 1, describes another embodiment of a system 125 operable in a visiting communication network 120 for enabling roaming to the visiting communication network of a first wireless communication terminal 130 belonging to a home communication network 110. The system 125 comprises a first sending module 902 for sending, to the home network, an information of a connection attempt from the first terminal 130 at the visiting network 120, a first receiving module 904 for receiving a request from the home network 110 to deploy virtual network functions 128 reflecting a number of network functions 117 existing in the home network. The system further comprises a deploying module 906 for deploying the virtual network functions 128 in the visiting network 120, in response to the received deployment request, and for communicating with the home communication network 110 in order to establish a virtual private network between the home network and the visiting network so that the virtual network functions 128 of the visiting network are connected to the network functions 117 of the home network. The system further comprises a second sending module 908 for sending information to the home network that the virtual network functions 128 are deployed for handling the first terminal 130, and a second receiving module 910 for receiving an acknowledgment from the home network that the home network acknowledges the connection attempt from the first terminal, in response to the sent information. The system 125 may further comprise a communication unit 802 similar to the communication unit of FIG. 13.

The computer programs 605 and 805 may respectively comprise computer readable code means, which when run in the system 115/the system 125 causes the respective system to perform the steps described in any of the described embodiments of the respective system. The respective computer program 605; 805 may be carried by a computer program product connectable to the respective processor 603; 803. The computer program product may be the memory 604; 804. The memory 604; 804 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the respective program could be downloaded into the respective memory 604; 804. Alternatively, the respective computer program may be stored on a server or any other entity connected to the communication network to which the respective system has access via the communication unit 602; 802 of the respective system. The respective computer program may then be downloaded from the server into the respective memory 604; 804.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally means that what is within the broken line is optional.

The invention claimed is:

1. A method, performed by a system of a home communication network for enabling roaming a first wireless communication terminal belonging to the home communication network to a visiting communication network, the method comprising:
receiving, from the visiting network, an information of a connection attempt from the first terminal at the visiting network;
detecting whether federated cloud roaming is allowed for the first terminal;
when federated cloud roaming is allowed for the first terminal, sending a request to the visiting network to deploy virtual network functions reflecting a number of network functions existing in the home network,
wherein the request to the visiting network to deploy virtual network functions comprises information on needed memory resources and processing capacity in the visiting network for the virtual network functions;
receiving an acknowledgement from the visiting network that the needed memory resources and processing capacity have been allocated;
in response to the received acknowledgement, sending an image file containing software for the virtual network functions to the visiting network;
communicating with the visiting network in order to establish a virtual private network between the home network and the visiting network so that the virtual network functions of the visiting network are connected to the network functions of the home network;
receiving information from the visiting network that the virtual network functions are deployed for handling the first terminal; and
in response to the received information, sending an acknowledgment to the visiting network that the home network acknowledges the connection attempt from the first terminal.

2. The method of claim 1, wherein the request to the visiting network to deploy the virtual network functions comprises an indicator indicating an image file pre-stored at the visiting network, the image file containing software for the virtual network functions.

3. The method of claim 1, further comprising:
- detecting whether a valid federated cloud roaming agreement exists between the home communication network and the visiting communication network; and
- when such a valid agreement exists, perform the sending of the request to deploy virtual network functions.

4. The method of claim 3, wherein the detecting of whether a federated cloud roaming agreement exists comprises:
- sending an authentication request to the visiting network; and
- receiving, in response to the sent authentication request, an authentication acknowledgement if the visiting network allowed federated cloud roaming for the home network.

5. A method, performed by a system of a visiting communication network for enabling roaming to the visiting communication network of a first wireless communication terminal belonging to a home communication network, the method comprising:
- sending, to the home network, an information of a connection attempt from the first terminal at the visiting network;
- receiving a request, from the home network, to deploy virtual network functions reflecting a number of network functions existing in the home network;
- in response to the received deployment request, deploying the virtual network functions in the visiting network and communicating with the home communication network in order to establish a virtual private network between the home network and the visiting network so that the virtual network functions of the visiting network are connected to the network functions of the home network,
  - wherein the received request from the home network to deploy the virtual network functions comprises information on needed memory resources and processing capacity in the visiting network for the virtual network functions;
- allocating the needed data resources;
  - sending an acknowledgement to the home network that the needed data resources has been allocated,
  - receiving from the home network, in response to the sent acknowledgement, an image file containing software for the virtual network functions;
- sending information to the home network that the virtual network functions are deployed for handling the first terminal; and
- receiving, in response to the sent information, an acknowledgment from the home network that the home network acknowledges the connection attempt from the first terminal.

6. The method of claim 5:
- further comprising, in response to receiving an allowance request from the home network, checking whether federal cloud roaming is allowed for the home network and if allowed, sending an allowance acknowledgement to the home network; and
- wherein the request from the home network to deploy virtual network functions is received in response to the sent allowance acknowledgement.

7. The method of claim 5, wherein the received request from the home network to deploy the virtual network functions comprises an indicator indicating an image file pre-stored at the visiting network, the image file containing software for the virtual network functions.

8. The method of claim 5, wherein the deployment of the virtual network functions includes deployment and configuration of the virtual network functions, the configuration of the virtual network functions, as well as needed network connectivity and capacity demands being performed or deployed according to configuration data received from the home network.

9. The method of claim 8, wherein the configuration of the virtual network functions is further performed according to limitations of a roaming agreement between the visited network and the home network.

10. The method of claim 5, wherein the virtual network functions comprises a virtual Packet Gateway reflecting a packet gateway (PGW) in the home network.

11. A system, operable in a home communication network, for enabling roaming of a first wireless communication terminal belonging to the home communication network to a visiting communication network, the system comprising:
- processing circuitry;
- memory containing instructions executable by the processing circuitry whereby the system is operative to:
  - receive, from the visiting network, an information of a connection attempt from the first terminal at the visiting network;
  - detect whether federated cloud roaming is allowed for the first terminal;
  - when federated cloud roaming is allowed for the first terminal, send a request to the visiting network to deploy virtual network functions reflecting a number of network functions existing in the home network,
    - wherein the request to the visiting network to deploy the virtual network functions comprises information on needed memory resources and processing capacity in the visiting network for the virtual network functions;
  - receive an acknowledgement from the visiting network that the needed memory resources and processing capacity have been allocated; and send, in response to the received acknowledgement, an image file containing software for the virtual network functions to the visiting network;
  - communicate with the visiting network in order to establish a virtual private network between the home network and the visiting network so that the virtual network functions of the visiting network are connected to the network functions of the home network; and
  - receive information from the visiting network that the virtual network functions are deployed for handling the first terminal;
  - send, in response to the received information, an acknowledgment to the visiting network that the home network acknowledges the connection attempt from the first terminal.

12. The system of claim 11, wherein the request to the visiting network to deploy the virtual network functions comprises an indicator indicating an image file pre-stored at the visiting network, the image file containing software for the virtual network functions.

13. The system of claim 11, wherein the instructions are such that the system is operative to:
- detect whether a valid federated cloud roaming agreement exists between the home communication network and the visiting communication network, and
- perform, when such a valid agreement exists, the sending of the request to deploy virtual network functions.

14. The system of claim 13, wherein the detecting whether a federated cloud roaming agreement exists comprises:
sending an authentication request to the visiting network; and
receiving, in response to the sent authentication request, an authentication acknowledgement if the visiting network allowed federated cloud roaming for the home network.

15. A system, operable in a visiting communication network, for enabling roaming to the visiting communication network of a first wireless communication terminal belonging to a home communication network, the system comprising:
processing circuitry;
memory containing instructions executable by the processing circuitry whereby the system is operative to:
send, to the home network, an information of a connection attempt from the first terminal at the visiting network;
receive a request from the home network to deploy virtual network functions reflecting a number of network functions existing in the home network;
in response to the received deployment request, deploy the virtual network functions in the visiting network and communicating with the home communication network in order to establish a virtual private network between the home network and the visiting network so that the virtual network functions of the visiting network are connected to the network functions of the home network,
wherein the request from the home network to deploy the virtual network functions comprises information on needed memory resources and processing capacity in the visiting network for the virtual network functions;
allocate the needed data resources;
send an acknowledgement to the home network that the needed data resources has been allocated;
receive, in response to the sent acknowledgement, an image file containing software for the virtual network functions, from the home network;
send information to the home network that the virtual network functions are deployed for handling the first terminal; and
receive, in response to the sent information, an acknowledgment from the home network that the home network acknowledges the connection attempt from the first terminal.

16. The system of claim 15, wherein the instructions are such that the system is operative to:
check, in response to receiving an allowance request from the home network, whether federal cloud roaming is allowed for the home network and if allowed, send an allowance acknowledgement to the home network; and
receive the request from the home network to deploy virtual network functions in response to the sent allowance acknowledgement.

17. The system of claim 15, wherein the request from the home network to deploy the virtual network functions comprises an indicator indicating an image file pre-stored at the visiting network, the image file containing software for the virtual network functions.

18. The system of claim 15, wherein the deployment of the virtual network functions includes deployment and configuration of the virtual network functions, configuration of the virtual network functions, as well as needed network connectivity and capacity demands being performed or deployed according to configuration data received from the home network.

19. The system of claim 15, wherein the virtual network functions comprises a virtual Packet Gateway reflecting a packet gateway (PGW) in the home network.

20. A non-transitory computer readable recording medium storing a computer program product for controlling a system of a home communication network for enabling roaming of a first wireless communication terminal belonging to the home communication network to a visiting communication network, the computer program product comprising software instructions which, when run on processing circuitry of the system, causes the system entity to:
receive, from the visiting network, an information of a connection attempt from the first terminal at the visiting network;
detect whether federated cloud roaming is allowed for the first terminal;
when federated cloud roaming is allowed for the first terminal, send a request to the visiting network to deploy virtual network functions reflecting a number of network functions existing in the home network,
wherein the request to the visiting network to deploy virtual network functions comprises information on needed memory resources and processing capacity in the visiting network for the virtual network functions;
receive an acknowledgement from the visiting network that the needed memory resources and processing capacity have been allocated;
in response to the received acknowledgement, sending an image file containing software for the virtual network functions to the visiting network;
communicate with the visiting network in order to establish a virtual private network between the home network and the visiting network so that the virtual network functions of the visiting network are connected to the network functions of the home network;
receive information from the visiting network that the virtual network functions are deployed for handling the first terminal; and
send, in response to the received information, an acknowledgment to the visiting network that the home network acknowledges the connection attempt from the first terminal.

21. A non-transitory computer readable recording medium storing a computer program product for controlling system of a visiting communication network for enabling roaming of a first wireless communication terminal belonging to a home communication network to the visiting communication network, the computer program product comprising software instructions which, when run on processing circuitry of the system entity, causes the system to:
send, to the home network, an information of a connection attempt from the first terminal at the visiting network;
receive a request from the home network to deploy virtual network functions reflecting a number of network functions existing in the home network,
in response to the received deployment request, deploy the virtual network functions in the visiting network and communicate with the home communication network in order to establish a virtual private network between the home network and the visiting network so that the virtual network functions of the visiting network are connected to the network functions of the home network, wherein the received request from the home network to deploy the virtual network functions comprises information on needed memory resources and processing capacity in the visiting network for the virtual network functions;

allocating the needed data resources;

send an acknowledgement to the home network that the needed data resources has been allocated, receive from the home network, in response to the sent acknowledgement, an image file containing software for the virtual network functions;

send information to the home network that the virtual network functions are deployed for handling the first terminal, and receive, in response to the sent information, an acknowledgment from the home network that the home network acknowledges the connection attempt from the first terminal.

\* \* \* \* \*